(12) United States Patent
McKenzie

(10) Patent No.: US 10,578,180 B2
(45) Date of Patent: Mar. 3, 2020

(54) AIR SPRING WITH CONSTRAINED ELASTIC SLEEVE

(71) Applicant: Maxine C. McKenzie, Spring Lake, MI (US)

(72) Inventor: Thomas A. McKenzie, Grand Haven, MI (US)

(73) Assignee: Richard Conaway, Grand Haven, MI (US)

( * ) Notice: Subject to any disclaimer, the term of this patent is extended or adjusted under 35 U.S.C. 154(b) by 0 days.

(21) Appl. No.: 15/352,235

(22) Filed: Nov. 15, 2016

(65) Prior Publication Data

US 2017/0058986 A1 Mar. 2, 2017

Related U.S. Application Data

(63) Continuation of application No. 14/122,498, filed as application No. PCT/US2012/041965 on Jun. 11, 2012, now abandoned.

(60) Provisional application No. 61/520,454, filed on Jun. 10, 2011.

(51) Int. Cl.
| | |
|---|---|
| *F16F 9/04* | (2006.01) |
| *B60G 11/27* | (2006.01) |
| *F16F 9/05* | (2006.01) |

(52) U.S. Cl.
CPC ............ *F16F 9/0436* (2013.01); *B60G 11/27* (2013.01); *F16F 9/0409* (2013.01); *F16F 9/0445* (2013.01); *F16F 9/05* (2013.01); *B60G 2202/152* (2013.01); *B60G 2206/42* (2013.01); *B60G 2206/424* (2013.01); *F16F 2222/126* (2013.01)

(58) Field of Classification Search
CPC .......... F16F 9/0436; F16F 9/0445; F16F 9/05; F16F 2222/126; F16F 9/0409; F16F 2222/12; B60G 11/27; B60G 2202/152; B60G 2206/42; B60G 2206/424
See application file for complete search history.

(56) References Cited

U.S. PATENT DOCUMENTS

| | | | | | |
|---|---|---|---|---|---|
| 3,033,558 | A | * | 5/1962 | Slemmons | B60G 11/28 267/64.24 |
| 3,074,709 | A | * | 1/1963 | Ellis | B60G 11/27 267/64.21 |
| 3,438,309 | A | * | 4/1969 | Boileau | F16F 9/0409 267/64.24 |
| 4,635,745 | A | * | 1/1987 | Myers | B60G 15/12 267/64.24 |
| 4,722,516 | A | * | 2/1988 | Gregg | F16F 9/38 188/322.12 |
| 2003/0094740 | A1 | * | 5/2003 | Weber | F16F 9/0454 267/64.11 |
| 2003/0102612 | A1 | * | 6/2003 | Branco | F16F 9/0409 267/64.24 |

(Continued)

*Primary Examiner* — Melody M Burch
(74) *Attorney, Agent, or Firm* — McGarry Bair PC

(57) ABSTRACT

An air spring comprises a hollow elastic sleeve, an end component for securing the air spring to a first frame, a hollow piston for securing the air spring to a second frame that is movable relative to the first frame, and a cylinder surrounding the hollow elastic sleeve to constrain the diameter of the hollow sleeve. A meniscus loop is formed adjacent the piston to define a major diameter of the air spring and thereby reduce the natural frequency of the air spring.

11 Claims, 4 Drawing Sheets

(56) References Cited

U.S. PATENT DOCUMENTS

2004/0195740 A1\* 10/2004 Gleu ........................ F16F 9/05
  267/64.24
2010/0001446 A1\* 1/2010 Oldenettel ............ F16F 9/0445
  267/122

\* cited by examiner

AIR SPRING WITH CONSTRAINED ELASTIC SLEEVE

CROSS-REFERENCE TO RELATED APPLICATION

This application is a continuation of U.S. application Ser. No. 14/122,498, filed Jul. 3, 2014, now abandoned, which is a national phase of International Application No. PCT/US2012/041965, filed Jun. 11, 2012, which claims the benefit of U.S. Provisional Application Ser. No. 61/520,454, filed Jun. 10, 2011, all of which are incorporated herein in their entireties.

BACKGROUND OF THE INVENTION

Field of the Invention

The invention relates to rolling lobe air springs, and more particularly to an improvement that reduces the natural frequency of a rolling lobe air spring.

Reducing the natural frequency of an air spring is known to improve ride quality in a motor vehicle. It is known to reduce the natural frequency of an air spring by increasing the volume of the spring itself, such as by increasing the size of the air spring or by selectively adding auxiliary volume via a so-called ping take. Vehicle structures normally place design constraints on the size of air springs that render is impossible to increase the height of the spring. And a significant limitation with the use of auxiliary volume is that the size of the delivery conduit to the air spring must be large enough to move high volumes of air at a very high speed. Again, vehicle structures place design constraints on the amount and speed of air to be delivered to an air spring. And adding such conduits introduces other issues.

Another known way of reducing the ride frequency of a suspension is to disadvantage the spring by reducing the lever ratio of the vehicle suspension. This design provides good results but with a big penalty. The spring must be larger if the lever ratio is less than 1 to 1. For example, the spring would need to carry three times the load with a 0.33 to 1 lever ratio. Another downside is that the suspension beam must carry more load between the pivot and the wheel end connection. The result is a larger spring and a larger suspension beam. The larger spring runs into the foregoing design constraints, and the larger beam adds cost and weight.

Perhaps the most common means of frequency reduction is to provide a "negative tapered" or "hourglass" piston in the air spring assembly. This structure reduces the effective area of the air spring, which makes the spring softer because the output force is reduced. But there is a limit to the possible frequency reduction because more than a 20 degree negative taper is impractical. The cords of the reinforcement fabric in the air spring sleeve will not allow a steeper angle. A 20 degree negative taper has become an "industry standard" based on both durability and dynamic testing.

Another known way to lower the frequency is to incline the air spring. Since I am a co-inventor of this means there are not very many who understand the advantage of using this means to lower the frequency. In our experimentation we found that depending of the angle of the spring relative to vertical you could achieve any frequency you wanted. The downside of this method is that the vertical force output pretty much follows the cosign of the angle of the spring. Example: cosign of 45 degrees (0.707)×the air spring force output (lbf)=vertical force (lbf). With using this example an air spring with around 41% larger effective area is required to suspend the mass of a chassis or truck cab.

BRIEF SUMMARY OF THE INVENTION

In one aspect, air spring includes a hollow elastic sleeve having a first end and second end. An end component provides for securing the air spring to a first frame, wherein the first end of the hollow elastic sleeve is secured to the end component. A hollow piston provides for securing the air spring to a second frame that is movable relative to the first frame, wherein the second end of the hollow elastic sleeve is secured to the piston. A cylinder surrounds the hollow elastic sleeve intermediate the end component and the piston to constrain a diameter of the hollow sleeve. A meniscus loop is formed between the piston and the cylinder and extends outside the diameter of the cylinder to define a major diameter of the air spring and thereby reduce the natural frequency of the air spring.

DETAILED DESCRIPTION OF THE DRAWINGS

Figure 1:
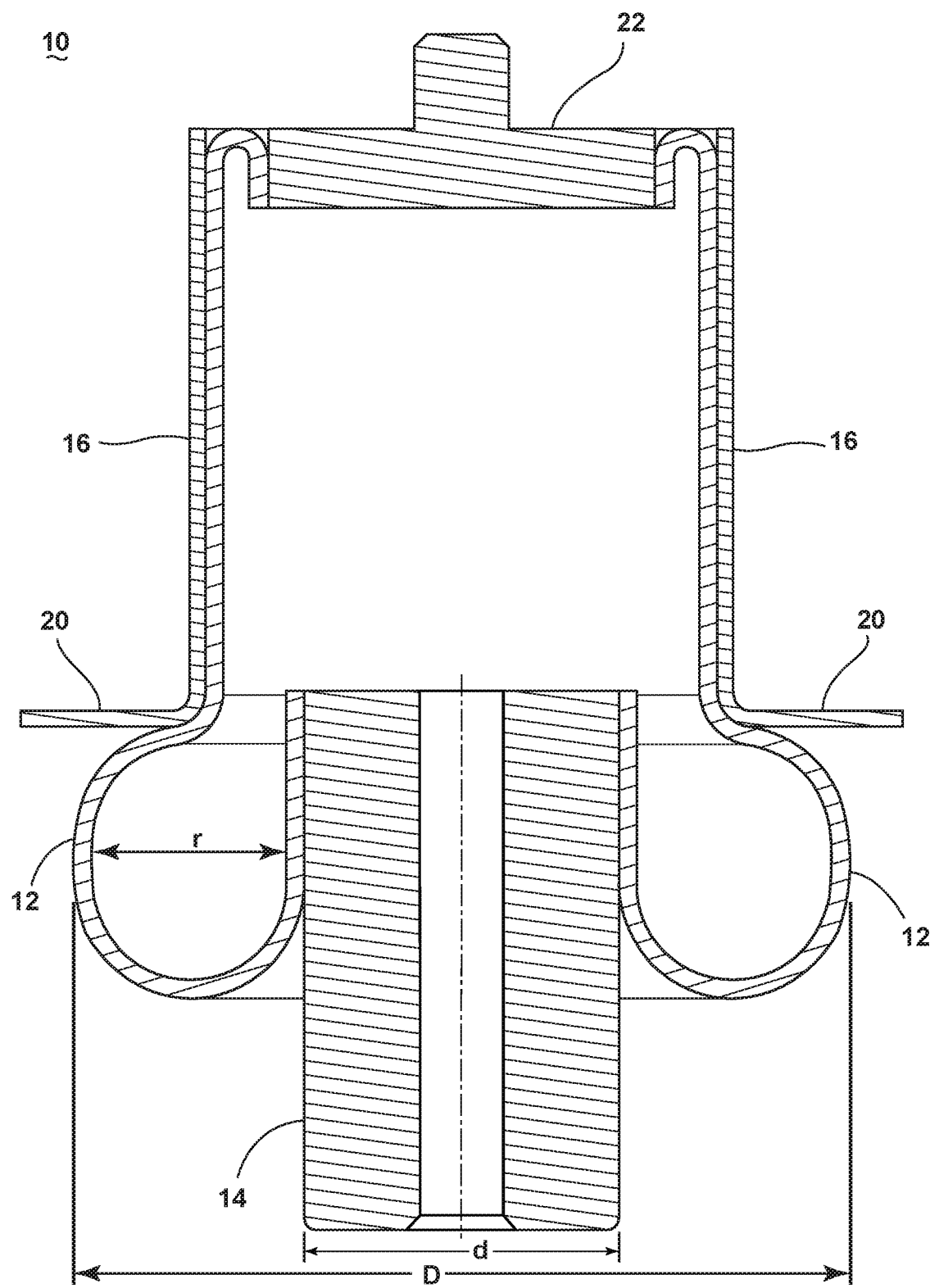
FIG. 1 is a schematic side view of an air spring according to a first embodiment of the invention.

FIG. 1 illustrates an air spring 10 according to an embodiment of the invention. The air spring 10 has an end component 22, a hollow piston 14, an elastic sleeve 12 and a cylinder 16 surrounding the elastic sleeve 12.

The air spring end component 22 is a member that couples the air spring (10) to a first frame such as a vehicle. They end component 22 may be a bead plate for larger springs, against which the elastic sleeve 12 can be mounted.

The air spring piston 14 is a hollow piston that couples the air spring 10 to a second frame such as a vehicle axle. In the embodiment of FIG. 1, the hollow piston has a neutral taper, meaning that the cylindrical wall of the piston is parallel to the longitudinal axis of the piston.

The air spring sleeve 12 couples the end component 22 and the piston 14. The sleeve 12 is a hollow, elastic component that acts as a deformable interconnection between the upper component 22 and the piston 14. A first end of the sleeve 12 is secured to the end component with a small loop that stays within the confines of the cylinder 16. A second end of the sleeve 12 is secured to the piston 14 with a larger meniscus loop that extends outside the confines of the cylinder 16 for a purpose to be explained later. The cylinder 16 is a rigid cylinder placed around and in direct contact with the air spring sleeve 12. The cylinder has a flanged bottom edge 20 on the end nearest the piston 14, adjacent the meniscus loop.

Figure 2:
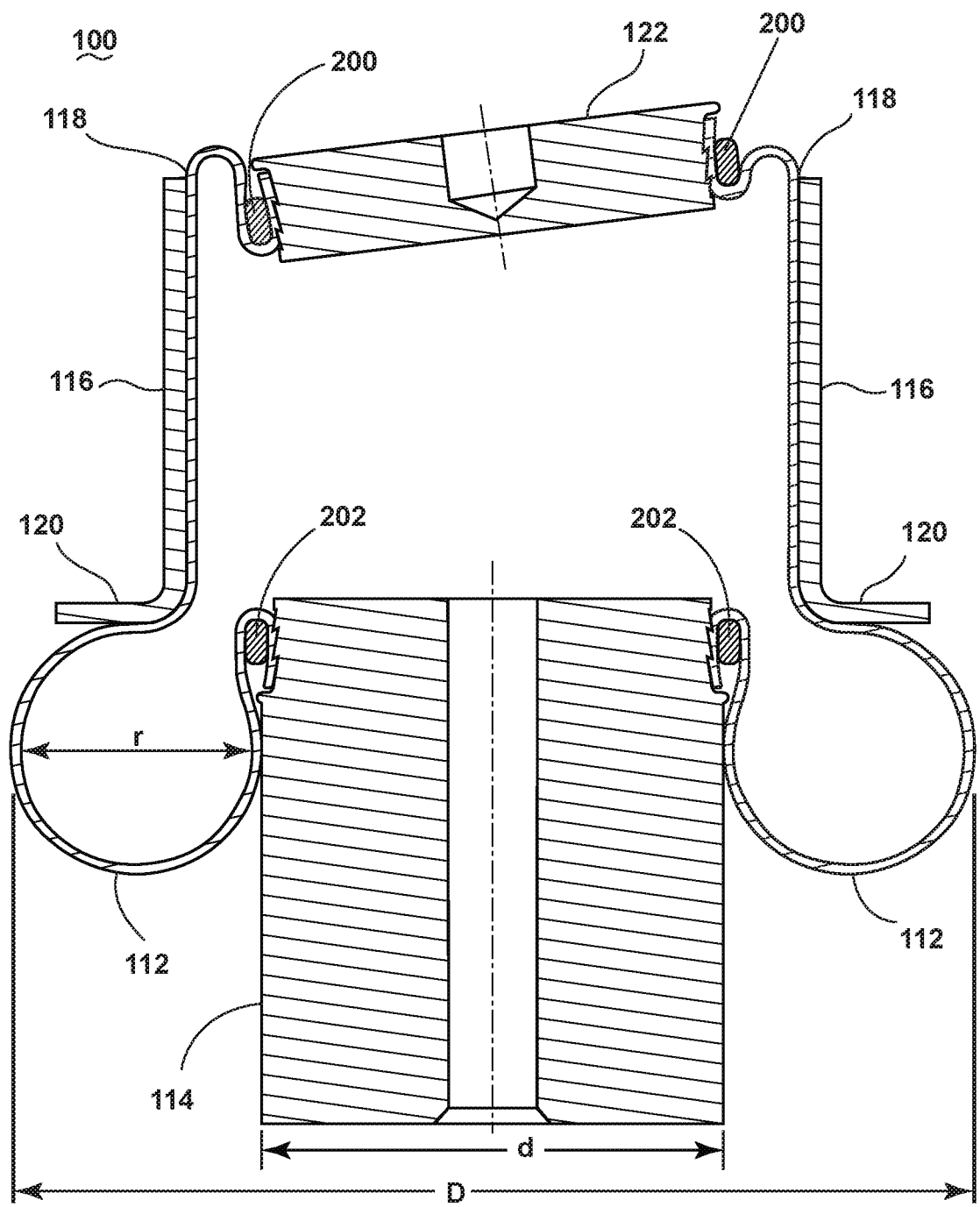
FIG. 2 is a schematic side view of an air spring according to a second embodiment of the invention.

FIG. 2 illustrates an air spring according to a second embodiment. The second embodiment is similar to the first embodiment; therefore, like parts will be identified with like numerals increased by 100, with it being understood that the description of the like parts of the first embodiment applies to the second embodiment, unless otherwise noted.

One difference between the air spring 10 and the air spring 110 is that the air spring end component 122 is rolled by about 7 degrees. The roll is accomplished by inclining the air spring end component 122 and by modifying the coupling between the end component 122 and the sleeve 118. Here the coupling includes crimp or clamp rings 200, 202 that secure the sleeve 118 to the end component 122 and to the piston 114, respectively. Additionally, the cylinder 116 surrounding the elastic sleeve does not extend to the same height as the air spring sleeve 112. Consequently, there is a filleted edge 118 between the upper edge of the cylinder 116 and the sleeve 112.

The air spring 10, 110 movably couples the first and second frames. When a force is applied to either frame, the air spring elastically transfers that force from one frame to the other. The elasticity of the transferral of force is defined by the elasticity of the sleeve 12, 112 and the allowable degrees of freedom of the deformation of the sleeve 12, 112.

One purpose of the air spring is to act as a suspension system for a vehicle and improve the vehicle ride quality by responding smoothly when bumps are encountered. A spring reacts to a jolt such as when a vehicle hits a bump with a well-known response that defines a spring rate. A spring rate is a measure of the natural frequency of the spring and may be expressed as:

$$K_{rate} = \frac{\zeta P_a A_e}{V_e} + \left(\frac{A_e - A_{e1}}{-1}\right) P_g$$

Where $K_{rate}$ is the spring rate, $A_e$ is the effective area of the spring as calculated below. $A_{e1}$ is the effective area of the spring after 1 inch of stroke of the piston, $P_g$ is gauge pressure, $P_a$ is atmospheric pressure, and $V_e$ is effective volume. $\zeta$ is a spring constant, normally equal to 1.3ε. The effective area is a function of the major diameter D, and the minor diameter d, and is expressed as:

$$A_e = \left[\frac{(D+d)}{2}\right]^2 9\pi/4,$$

where D is the major diameter and d is the minor diameter. The major diameter D is the diameter of the maximum lateral extension of the elastic sleeve 12, 112, shown in FIGS. 1 and 2 as being at the meniscus adjacent the piston 14, 114 and unconstrained by the sleeve 16, 116. The minor diameter is the diameter of the piston where the elastic sleeve 12, 112 contacts the piston 14, 114 as it rolls thereon before it departs the piston to form the meniscus.

A smooth response correlates to having a lower natural frequency in the air spring. The response is a function of the major diameter D. To reduce the natural frequency of an air spring, the effective area of the spring can be reduced. One way to reduce the effective area of the spring is to reduce the major diameter D.

The air spring 10 is a type of rolling lobe air spring. A rolling lobe air spring reacts to changes in force by allowing the elastic sleeve 12, 112 to roll along the piston 14, 114. In a typical rolling lobe air spring, the diameter of the elastic sleeve 12, 112 will increase in response to force applied to the air spring. The cylinder 16, 116 constrains the diameter of the air spring 10, 100 by limiting the maximum deflection of the sleeve 12, 112 away from the piston, thereby reducing the effective area of the air spring. This is accomplished by reducing, but not eliminating, the amount of the sleeve 12, 112 that is allowed to form the major diameter D as force is applied to the air spring 10, 100. The small amount of air spring allowed by the cylinder 16, 116 to form the major diameter D is the meniscus loop having a radius r. The effective area is reduced based on the size of the radius of the meniscus loop. The existence of the meniscus loop effectively reduces the natural frequency of the spring; the size of the meniscus loop (radius r) affects the speed at which the effective area is reduced. The wall of meniscus loop rolls against the piston 14, 114 and the flange 20, 120 as the piston moves within the elastic sleeve 12, 112 in response to relative movement between the first and second frames.

By reducing the majority of the air spring sleeve 12 from deflecting outwards with the effective area reduction cylinder 16 and allowing a small amount of sleeve 12 to form the major diameter D, the effective area is reduced based on the size of the radius of the meniscus loop formed by the sleeve 12 along the piston 14. The smaller the loop, the faster the effective area is reduced; thus lowering the frequency faster. During testing with a neutral tapered piston the spring rate was reduced by 38% by the inventive structure.

The air spring of the current invention may be embodied to use other techniques known in the art for reducing the natural frequency of the spring. For example, the embodiment of the invention in FIG. 2 is shown with an inclination of 7 degrees. Inclining the spring is another technique known to reduce the natural frequency of the spring.

Figure 3:
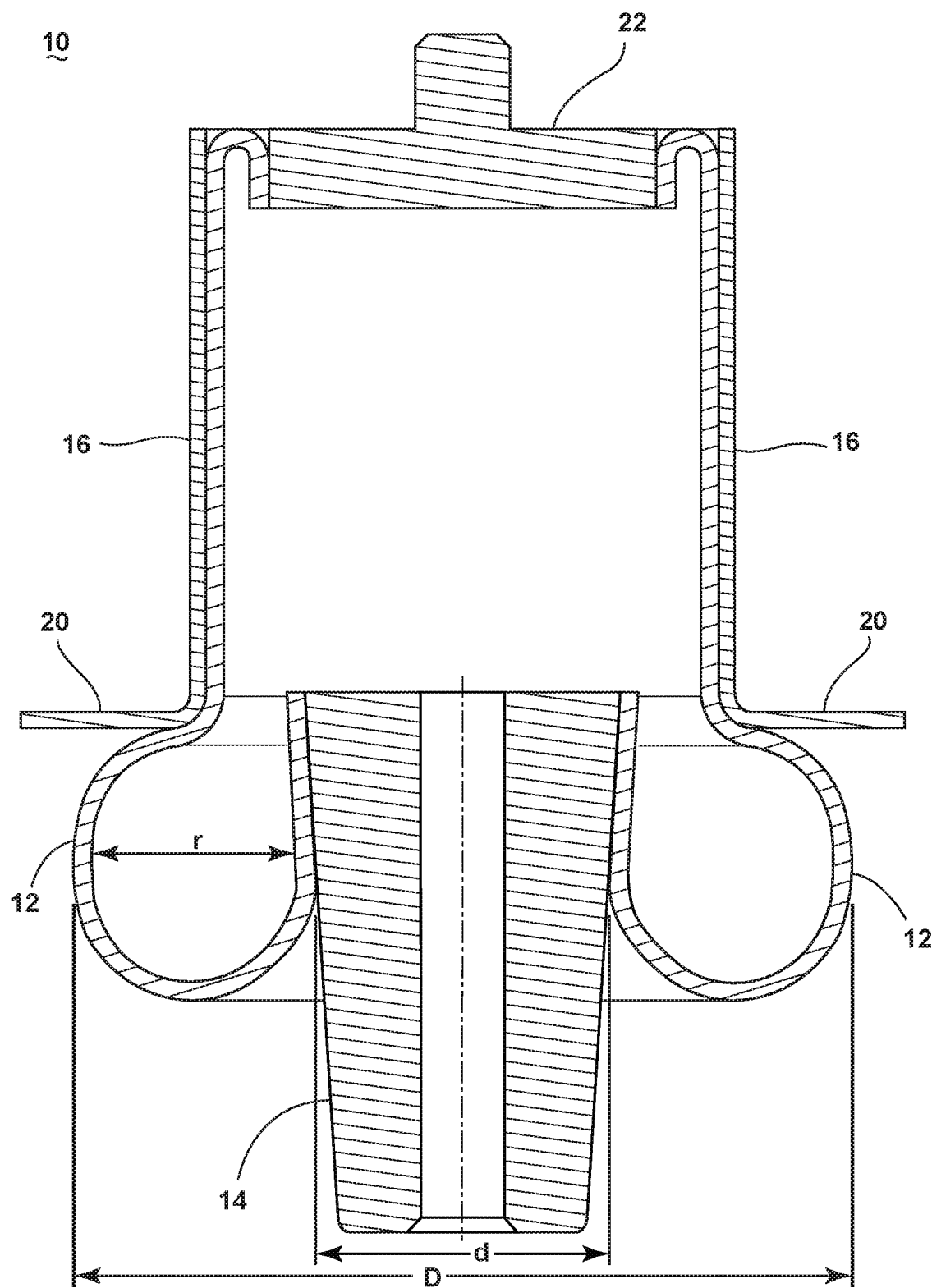
FIG. 3 is a schematic side view of an air spring according to a third embodiment of the invention.
Figure 4:
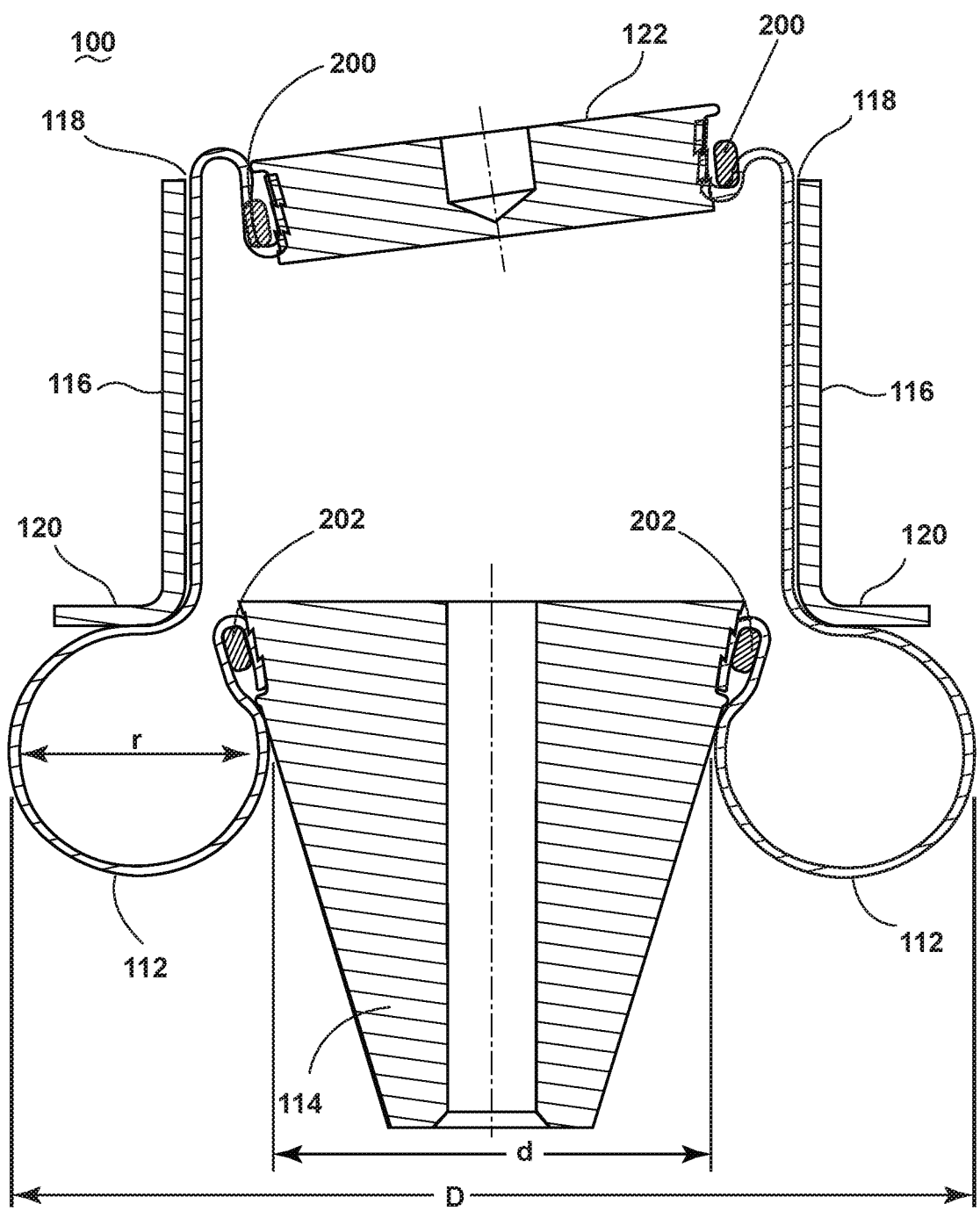
FIG. 4 is a schematic side view of an air spring according to a fourth embodiment of the invention.

FIGS. 3 and 4 show another technique that, coupled with the inventive structure, provides additional frequency reduction. FIG. 3 is the embodiment of FIG. 1, wherein the piston 14 has a negative taper. FIG. 4 is the embodiment of FIG. 2, wherein the piston 114 has a negative taper. Applying a negative taper to the piston, either in an hourglass or a straight negative taper as shown, would increase the reduction of effective area more than the neutral taper of FIGS. 1 and 2.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

The invention claimed is:

1. An air spring comprising:
a hollow elastic sleeve having a first end and second end;
an end component configured to be coupled to a first frame, wherein the first end of the hollow elastic sleeve is secured to the end component with a small loop at the first end of the hollow elastic sleeve;
a piston configured to be coupled to a second frame that is movable relative to the first frame and having a non-positively tapered surface, wherein the second end of the hollow elastic sleeve is secured to the piston with a meniscus loop at the second end of the hollow elastic sleeve;
a cylinder surrounding the hollow elastic sleeve extending from the end component to the piston with a cylinder diameter that constrains a diameter of the hollow elastic sleeve within the cylinder, wherein at least a portion of the end component where the first end of the hollow elastic sleeve is secured to the end component is within the cylinder with the small loop disposed between the cylinder and the end component, and wherein the end component is rotatable relative to the cylinder; and a flange extending substantially normally outwardly from the cylinder wherein at least a portion of the piston is within the cylinder where the flange extends, wherein the meniscus loop extends outside the diameter of the cylinder to roll against the flange and against the non-positively tapered surface to define a major diameter of the air spring that varies as the piston moves relative to the cylinder thereby effectively reducing the natural frequency of the air spring.

2. The air spring of claim 1 wherein the cylinder is rigid and hollow.

3. The air spring of claim 1 wherein the small loop is smaller than the meniscus loop.

4. The air spring of claim 1 wherein the small loop does not extend beyond a diameter of the cylinder.

5. The air spring of claim 1 wherein the non-positively tapered surface is a negatively tapered surface against which the meniscus loop rolls.

6. The air spring of claim 1 wherein the cylinder is rotated relative to the end component about seven degrees.

7. In a vehicle having a first frame, a second frame moveable relative to the first frame, an air spring comprising:
- a hollow elastic sleeve having a first end and second end;
- an end component coupled to the first frame, wherein the first end of the hollow elastic sleeve is secured to the end component;
- a piston coupled to the second frame and having a non-positively tapered surface wherein the second end of the hollow elastic sleeve is secured to the piston;
- a cylinder surrounding the hollow elastic sleeve and extending from the end component to the piston to constrain a diameter of the hollow sleeve, the cylinder having
- a flange that extends substantially normally outwardly from the cylinder, and at least a portion of the end component where the first end of the hollow elastic sleeve is secured to the end component is within the cylinder with the cylinder rotatable relative to the end component;

wherein a meniscus loop is formed in the hollow elastic sleeve between the piston and the flange to roll against the flange and the non-positively tapered surface, wherein the meniscus loop extends outside the diameter of the cylinder to define a major diameter of the air spring that varies as the piston moves relative to the cylinder thereby reducing the natural frequency of the air spring.

8. The air spring of claim 7 wherein the cylinder is rigid and hollow.

9. The air spring of claim 7 wherein the cylinder is located so a flexible loop of the elastic sleeve at the end component is smaller than the meniscus loop.

10. The air spring of claim 9 wherein the does not extend beyond a diameter of the cylinder.

11. The air spring of claim 7 where the cylinder is rotated relative to the end component about seven degrees.

\* \* \* \* \*